Patented Aug. 6, 1935

2,010,792

UNITED STATES PATENT OFFICE 2,010,792

COLLOIDAL STEROL DISPERSION SYSTEM IN WATER

Jacob Siegel, New York, N. Y., assignor to Abel M. Silvan, Brooklyn, N. Y.

No Drawing. Application May 10, 1933, Serial No. 670,305

3 Claims. (Cl. 167—58)

The present invention relates to colloidal sterol dispersion systems in water and methods for preparing the same.

One of the objects of the present invention is to provide a colloidal dispersion of a sterol in water.

Another object is to provide an activated sterol preparation colloidally dispersed in water and containing in addition thereto inorganic substances such as salts of calcium, phosphorus, iron or copper.

An additional object is to provide methods for bringing either unactivated sterols or irradiated sterols into colloidal solution with water as the dispersion medium.

A further object is to provide methods for preparing a colloidal solution in water wherein the disperse phase contains irradiated sterols, calcium and phosphorus.

Still further objects will appear in the course of the detailed description now to be given wherein the products hereinabove referred to will be described as well as a certain number of methods for preparing the same.

The general principles underlying the methods used are the following:

Organic substances preferably of the nature of vegetable or animal matter such as alfalfa, bone meal or meat, or combinations of these are first treated with fifty per cent ethyl alcohol or fifty per cent acetone, or water alone and filtered; the filtrate contains substances capable of a protective function when agitated with sterols in water. Sterols brought into colloidal solution by this filtrate, when filtered, yield a stable colloidal dispersion capable (1) of being used as an antirachitic agent, if already irradiated, or (2) of being irradiated and rendered active, (3) of being enriched in calcium and phosphorus content by the addition of the solutions of calcium chloride and potassium acid phosphate, thus eliminating the necessity of administering these essential salts separately, as is done at present for antirachitic purposes, (4) of being enriched in other inorganic elements, such as iron, copper and manganese by the addition of proper solutions containing these elements, well known to those skilled in the art, thus eliminating the necessity of administering these salts separately for increasing the general vitality of patients treated with antirachitic substances.

The applications enumerated above are not intended to limit the uses to which a colloidal solution of sterols in water may be put, whether said solution be activated or unactivated; nor is this enumeration intended to limit the uses to which a colloidal solution of sterols enriched with inorganic salts may be put, whether activated or unactivated.

The following is a typical procedure:

75 gm. of a mixture, containing calcium phosphate, bone meal and alfalfa and analyzing about 85% mineral matter, 9% protein and 4% fat, is treated with 500 c. c. of 50% ethyl alcohol or 50% acetone or water alone and filtered. The filtrate contains protective colloids capable of maintaining sterols in a colloidal state with water as the dispersion medium. 1 gm. of crystalline ergosterol or crystalline cholesterol or other substantially pure sterol is added to this protecting filtrate together with small quantities (10 c. c.) of caprylic alcohol, (the latter serving to prevent foaming and to facilitate colloidal dispersion of the crystalline ergosterol or other sterol). The solution thus obtained is evaporated to dryness in a vacuum or otherwise. The dry mass is then taken up with 100 c. c. of distilled water or physiologic salt solution (0.9% sodium chloride) and the lixiviated mass is brought to a boil and then centrifuged for ten minutes. The supernatant solution is filtered through coarse filter paper and yields a filtrate containing from ½% to 1% ergosterol or other sterol used, about 5 mgs. of phosphorus and 5 mgs. of calcium, all in the form of a fine yellowish stable colloidal solution. If it be desired to recover sterols remaining on the filter paper or in the solid residue of the centrifuged mass, this may be done by extracting with chloroform or some other fat-solvent and evaporating off the latter. The colloidal solution may be enriched in calcium phosphate to any degree desired by adding solutions of soluble calcium and phosphorus salts such as calcium chloride and potassium acid phosphate. If the sterol originally used has not been irradiated, the colloidal solution may be irradiated by exposure for thirty minutes to a source of ultra violet rays, (about 2650A at a distance of eighteen inches in a manner familiar to those skilled in the art. The final product is a stable colloidal disperson of solid activated ergosterol or other activated sterol in water and contains in addition thereto both calcium and phosphorus.

The use of caprylic alcohol is entirely optional. However, it has been found to prevent foaming very successfuly, and when used as above described aids dispersion of the sterol in water.

The use of the special mixture of calcium phosphate, alfalfa and bone meal is not indispensable, this preparation serving merely as a source of substances having a protective action on the sterols. Other organic substances may be used. If alfalfa alone be employed as a starting material, the following method may be used:

50 gm. of alfalfa are extracted with 500 c. c. of 50% ethyl alcohol or water; the solution is brought to a boil, then filtered and evaporated to a semi-solid paste. 1 gm. of crystaline ergosterol, cholesterol or other sterol is added to the paste together with a small quantity of caprylic alcohol. The mixture is evaporated to dryness, then taken up with 100 c. c. of water or saline, centrifuged and filtered to yield a colloidal solution as above described which may be irradiated if desired or necessary. This colloidal solution may also be enriched in calcium and phosphorus or other inorganic elements as already indicated.

If it be desired to use acetone as a solvent, the following procedure may be followed:

50 gm. of alfalfa are mixed with 300 c. c. of 50% acetone in water and brought to a boil. The solution is filtered, evaporated to a semi-solid paste; 1 gm. ergosterol or other sterol is added; evaporation is pushed to dryness and the dry mass extracted with 100 c. c. of water or saline, spun in a centrifuge and then filtered to yield a colloidal solution of the sterol in water.

Whatever be the procedure employed, the final product, if activated, is found by biologic tests to have a powerful antirachitic and growth stimulating action.

The sterols employed may take the form of cholesterol, phytosterol, ergosterol or any of the other sterols familiar to those skilled in the art. As already indicated, these sterols may be irradiated prior to being taken into colloidal solution or after they are dispersed in water.

It is to be understood that the invention is not limited to the use of alfalfa as an organic material of vegetable origin. Other grasses or plants may be used capable of yielding an extract having a protective action on sterols.

The activated product for the special uses desired may be obtained in either of the following ways:

1. Activated ergosterol or other sterol may be used at the start.

2. If unactivated ergosterol, or other sterol is used, activation may be accomplished as described above by the use of ultra violet light rays directly on the aqueous colloidal solution.

3. If unactivated ergosterol or other sterol is used, the final colloidal solution may be treated with an equal volume of acetone, and the resulting solution may be then activated by exposure to the action of ultra violet light rays as described above. The acetone may be then removed by evaporation, leaving an activated colloidal solution with water as the dispersion medium.

To sumarize, alfalfa, bone meal, meat and similar vegetable and animal materials of organic origin are first extracted with ethyl alcohol or acetone solution or water. To the extracts sterols are added, the mixture is evaporated to dryness; the dry mass taken up with water, then centrifuged and filtered to yield a clear yellowish colloidal solution. If the starting substance is of the nature of a mixture, which contains a certain amount of calcium phosphate, the final product will also contain calcium phosphate in colloidal suspension with the sterol. But if the amount of calcium phosphate is lower than that desired (case of extraction of alfalfa alone) the deficiency may be corrected by adding finely ground calcium chloride and potassium acid phosphate solutions, or their chemical equivalents. If the sterol used is originally activated or if the final product is activated as described above, the final product is antirachitic and contains calcium phosphate capable of coacting with the Vitamin D in the sterol to correct rachitic states.

While the invention has been described with relation to the addition or incorporation of calcium phosphate, it is not to be taken as limited to the use of this inorganic substance. If it be desired to add other inorganic materials such as iron or copper to remedy the anaemic symptoms which generally accompany rickets, this may be done by adding dissolved iron chloride or copper sulphate or other iron or copper salts, soluble in water.

What I claim is:

1. A product prepared by treating a mixture of bone-meal and alfalfa with a water solution of alcohol or acetone, evaporating the extract to a small volume, adding a desired amount of solid sterol, evaporating to just dryness, and then adding a desired volume of water or saline.

2. A product prepared by treating a mixture of bone-meal and meat with a water solution of alcohol or acetone, evaporating the extract to a small volume, adding a desired amount of solid sterol, evaporating to just dryness, and then adding a desired volume of water or saline.

3. A product prepared by treating a mixture of alfalfa and meat with a water solution of alcohol or acetone, evaporating the extract to a small volume, adding a desired amount of solid sterol, evaporating to just dryness, and then adding a desired volume of water or saline.

JACOB SIEGEL.